(12) United States Patent
Liao et al.

(10) Patent No.: US 8,830,210 B2
(45) Date of Patent: Sep. 9, 2014

(54) OPTICAL TOUCH APPARATUS AND DRIVE METHOD TO CONTROL AN AVERAGE BRIGHTNESS OF LEDS

(75) Inventors: Chun-Chien Liao, Hsin-Chu (TW);
Chih-Jen Tsang, Hsin-Chu (TW);
Yu-Lun Jhu, Hsin-Chu (TW);
Chwen-Tay Hwang, Hsin-Chu (TW);
Hai-Yuan Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 1024 days.

(21) Appl. No.: 12/886,500

(22) Filed: Sep. 20, 2010

(65) Prior Publication Data

US 2011/0102377 A1    May 5, 2011

(30) Foreign Application Priority Data

Nov. 4, 2009   (TW) .............................. 98137462 A

(51) Int. Cl.
*G06F 3/042*    (2006.01)
*G06K 11/06*    (2006.01)

(52) U.S. Cl.
CPC ............ *G06F 3/0428* (2013.01); *G02B 6/0068* (2013.01)
USPC ...................... 345/175; 178/18.09; 178/18.11

(58) Field of Classification Search
CPC ....... G06F 3/041; G06F 3/042; G06F 3/0421; G06F 3/0428; G06F 3/0304; G02B 6/0066; G02B 6/0068; G02B 6/0071; G02B 6/0078
USPC .................... 345/173–183; 178/18.01–20.04; 385/146; 250/221, 208.6, 205, 206.1
See application file for complete search history.

(56) References Cited

U.S. PATENT DOCUMENTS

| 5,162,783 | A  | * | 11/1992 | Moreno ......................... 345/175 |
| 6,480,187 | B1 | * | 11/2002 | Sano et al. .................... 345/175 |
| 7,232,986 | B2 | * | 6/2007  | Worthington et al. ......... 250/221 |
| 7,358,961 | B2 | * | 4/2008  | Zwanenburg .................. 345/173 |
| 7,629,968 | B2 | * | 12/2009 | Miller et al. ................... 345/173 |

(Continued)

FOREIGN PATENT DOCUMENTS

| TW | 200820054  | 5/2008  |
| TW | M341894    | 10/2008 |
| WO | 2006004764 | 1/2006  |

OTHER PUBLICATIONS

"Office Action of Taiwan Counterpart Application", issued on Jul. 16, 2013, p. 1-p. 3.

*Primary Examiner* — Dwayne Bost
*Assistant Examiner* — Darlene M Ritchie
(74) *Attorney, Agent, or Firm* — Jianq Chyun IP Office

(57) ABSTRACT

An optical touch apparatus including a first light emitting device, a second light emitting device, a third light emitting device, a fourth light emitting device, a first image detector, a second image detector, and a control unit is provided. The control unit controls the average brightness of the third light emitting device less than each of the average brightness of the second light emitting device and the fourth light emitting device when the control unit controls the first image detector to detect an image. The control unit controls the average brightness of the second light emitting device less than each of the average brightness of the first light emitting device and the third light emitting device when the control unit controls the second image detector to detect an image. A driving method is also provided.

29 Claims, 9 Drawing Sheets

(56) References Cited

U.S. PATENT DOCUMENTS

| | | | |
|---|---|---|---|
| 7,705,835 B2* | 4/2010 | Eikman | 345/176 |
| 8,149,221 B2* | 4/2012 | Newton | 345/173 |
| 8,184,108 B2* | 5/2012 | Smits | 345/175 |
| 8,325,156 B2* | 12/2012 | Lai | 345/175 |
| 8,436,833 B2* | 5/2013 | King et al. | 345/175 |
| 8,502,803 B2* | 8/2013 | Lieberman et al. | 345/175 |
| 8,508,509 B2* | 8/2013 | Lu et al. | 345/175 |
| 8,542,217 B2* | 9/2013 | Wassvik et al. | 345/175 |
| 2005/0178953 A1* | 8/2005 | Worthington et al. | 250/221 |
| 2006/0001653 A1 | 1/2006 | Smits | |
| 2006/0290684 A1* | 12/2006 | Giraldo et al. | 345/175 |
| 2007/0253717 A1 | 11/2007 | Charters et al. | |
| 2008/0142682 A1* | 6/2008 | Kawakami | 250/205 |
| 2008/0278460 A1* | 11/2008 | Arnett et al. | 345/175 |
| 2009/0219261 A1* | 9/2009 | Jacobson et al. | 345/175 |
| 2009/0225058 A1* | 9/2009 | Tateuchi et al. | 345/175 |
| 2010/0177062 A1* | 7/2010 | Liu et al. | 345/175 |
| 2010/0238139 A1* | 9/2010 | Goertz et al. | 345/175 |
| 2010/0245293 A1* | 9/2010 | Onishi | 345/175 |
| 2010/0277436 A1* | 11/2010 | Feng et al. | 345/175 |
| 2010/0295821 A1* | 11/2010 | Chang et al. | 345/175 |
| 2010/0309169 A1* | 12/2010 | Lieberman et al. | 345/175 |
| 2010/0321309 A1* | 12/2010 | Lee et al. | 345/173 |
| 2011/0032215 A1* | 2/2011 | Sirotich et al. | 345/175 |
| 2011/0061950 A1* | 3/2011 | Cheng et al. | 178/18.09 |
| 2011/0096001 A1* | 4/2011 | Lin et al. | 345/173 |
| 2011/0102377 A1* | 5/2011 | Liao et al. | 345/175 |
| 2011/0147569 A1* | 6/2011 | Drumm | 250/208.6 |
| 2012/0249478 A1* | 10/2012 | Chang et al. | 345/175 |

* cited by examiner

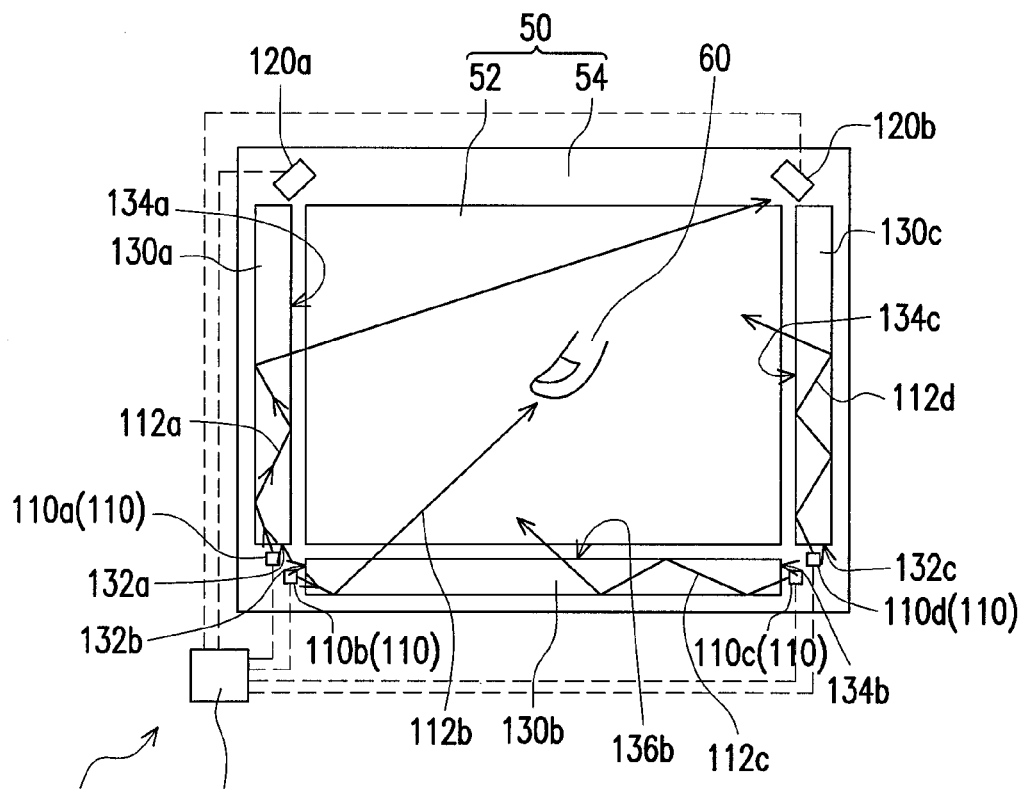
FIG. 1
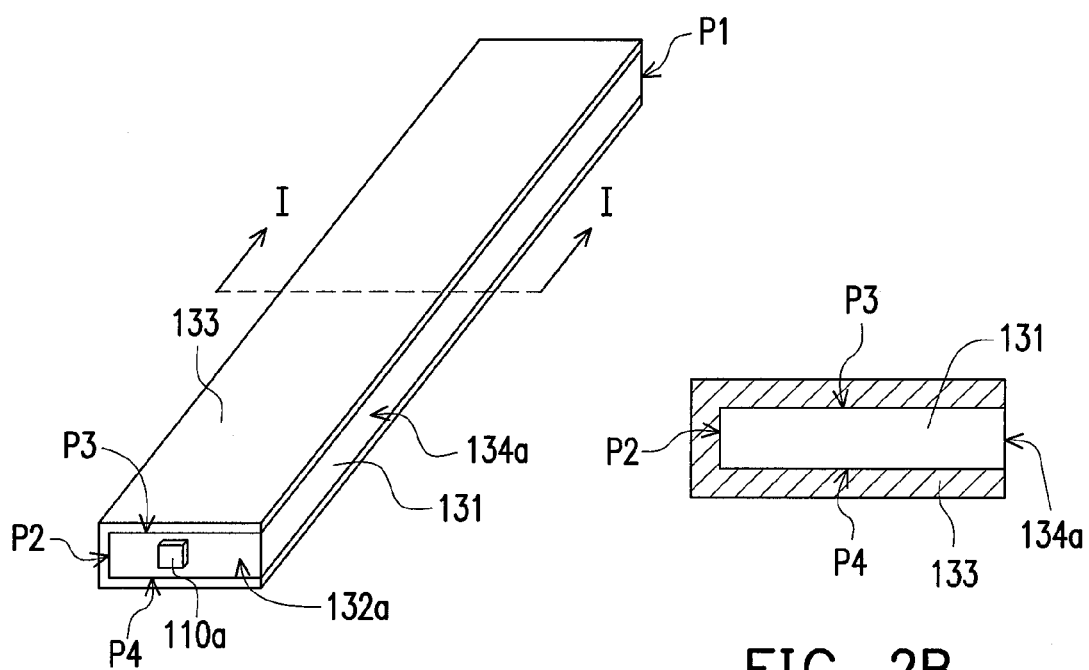
FIG. 2A
FIG. 2B

OPTICAL TOUCH APPARATUS AND DRIVE METHOD TO CONTROL AN AVERAGE BRIGHTNESS OF LEDS

CROSS-REFERENCE TO RELATED APPLICATION

This application claims the priority benefit of Taiwan application serial no. 98137462, filed on Nov. 4, 2009. The entirety of the above-mentioned patent application is hereby incorporated by reference herein and made a part of this specification.

BACKGROUND OF THE INVENTION

1. Field of the Invention

The invention relates to a touch apparatus and a driving method thereof, and more particularly to an optical touch apparatus and a driving method thereof.

2. Description of Related Art

With the development of optoelectronic technology, the user's requirement may not be satisfied through controlling the computer and objects in the screen by using the mouse. Accordingly, a method more humanistic than the mouse is gradually developed. Among these humanistic methods, the touch method by using fingers is closest to the human experience in the daily life. Particularly, for elders and children unable to use the mouse smartly, they may touch with fingers easily. The advantage has been partially proved from the touch screen used in the automated teller machine (ATM).

Furthermore, in the conventional computer without being externally connected with the mouse, the cursor is usually controlled by the touch plate located beside the key-presses or the track point. However, for the user, one may control the cursor more smartly by using the mouse instead of the touch plate located beside the key-presses or the track point, but this issue may be overcome by using the touch panel disposed on the screen. Because the control method by using the touch panel is a direct control method, the user may control the objects by directly touching the screen. In this manner, when the touch panel is applied to the notebook, even under the condition that the mouse is inconvenient to be connected to the notebook, the user may still smartly operate by using the touch panel.

Currently, based on the design, a touch sensing panel may be generally categorized into a resistive touch sensing panel, a capacitive touch sensing panel, an optical touch sensing panel, an acoustic-wave touch sensing panel, and an electro-magnetic touch sensing panel. Generally, in the resistive touch sensing panel, by the pressure of pressing a single point, the conductive layers originally separated are connected to each other, so that the conductive layers are conducted, thereby generating a voltage difference. By measuring and calculating the voltage difference, the touch position may be determined. In the capacitive touch sensing panel, the electric field is generated in the conductive layers. When the object, such as the finger, touches the touch sensing panel, a charge flow is generated, thereby generating a small capacitance difference. By measuring the capacitance difference, the touch position may be determined.

SUMMARY OF THE INVENTION

The invention provides an optical touch apparatus, having higher accuracy, uniformity, and planarity.

The invention provides a driving method. By the driving method, an optical touch apparatus has higher accuracy, uniformity, and planarity.

Other purposes and advantages of the invention may be further understood by referring to the technical features broadly embodied and described as follows.

In order to achieve at least one of the above advantages or other advantages, an embodiment of the invention provides an optical touch apparatus including a plurality of light emitting devices, a first image detector, a second image detector, a first light guiding unit, a second light guiding unit, a third light guiding unit, and a control unit. These light emitting devices includes a first light emitting device, a second light emitting device, a third light emitting device, and a fourth light emitting device respectively disposed beside a display area and capable of respectively emitting a first beam, a second beam, a third beam, and a fourth beam. The first image detector is disposed beside the display area, and the second image detector is disposed beside the display area. The first light guiding unit is disposed beside the display area, located within a detecting range of the second image detector, and located in a transmission path of the first beam. The second light guiding unit is disposed beside the display area, located within a detecting range of the first image detector and the detecting range of the second image detector, and located in transmission paths of the second beam and the third beam. The second light emitting device and the third light emitting device are respectively located at two opposite sides of the second light guiding unit. The third light guiding unit is disposed beside the display area, located within a detecting range of the first image detector, and located in a transmission path of the fourth beam. The second light emitting device is nearer to the first light guiding unit than the third light emitting device is, and the third light emitting device is nearer to the third light guiding unit than the second light emitting device is. The control unit is electrically connected to the first light emitting device, the second light emitting device, the third light emitting device, the fourth light emitting device, the first image detector, and the second image detector. The control unit controls an average brightness of the third light emitting device less than an average brightness of the second light emitting device and less than an average brightness of the fourth light emitting device when the control unit controls the first image detector to detect a first image. The control unit controls the average brightness of the second light emitting device less than an average brightness of the first light emitting device and less than the average brightness of the third light emitting device when the control unit controls the second image detector to detect a second image.

Another embodiment of the invention provides a driving method adapted to drive an optical touch apparatus. The driving method includes the following step: controlling a first image detector of the optical touch apparatus to detect a first image, and controlling an average brightness of a third light emitting device of the optical touch apparatus less than an average brightness of a second light emitting device of the optical touch apparatus and less than an average brightness of a fourth light emitting device of the optical touch apparatus in a first unit time. The first image detector is capable of detecting beams emitted by the second light emitting device, the third light emitting device, and the fourth light emitting device, and the second light emitting device is nearer to the first image detector than the third light emitting device is.

In summary, the embodiment or the embodiments of the invention may have at least one of the following advantages:

In the optical touch apparatus and the driving method of the embodiment of the invention, when the different image detectors detect images, by modulating the brightness of these light emitting devices, the image detectors may detect more uniform light distribution, thereby enhancing the accuracy, the uniformity, and the planarity of the optical touch apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic structure diagram of an optical touch apparatus according to an embodiment of the invention.

FIG. 2A is a schematic three-dimensional view of a first light guiding unit and a first light emitting device in FIG. 1.

FIG. 2B is a schematic cross-sectional view of the first light emitting device in FIG. 2A.

DESCRIPTION OF EMBODIMENTS

Figure 3A:
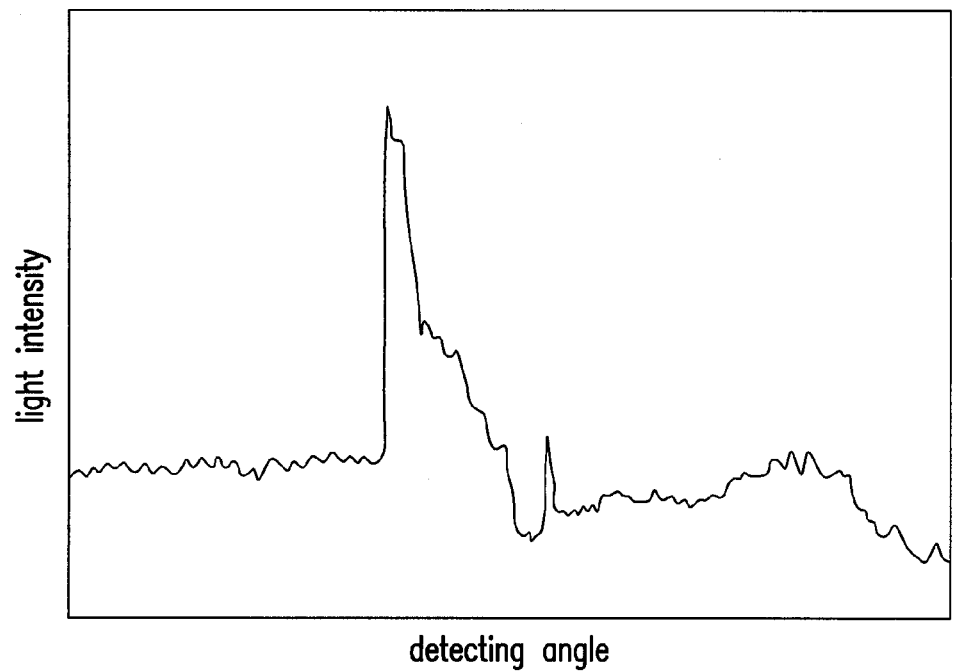
FIG. 3A is a distribution of the light intensity detected by the second image detector when the average brightness of the first light emitting device, the average brightness of the second light emitting device, and the average brightness of the third light emitting device are equal.

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Referring to FIG. 1, FIG. 2A, and FIG. 2B, the optical touch apparatus 100 of the embodiment includes a plurality of light emitting devices 110, a first image detector 120a, a second image detector 120b, a first light guiding unit 130a, a second light guiding unit 130b, a third light guiding unit 130c, and a control unit 140. These light emitting devices 110 includes a first light emitting device 110a, a second light emitting device 110b, a third light emitting device 110c, and a fourth light emitting device 110d respectively disposed beside a display area 52 and capable of respectively emitting a first beam 112a, a second beam 112b, a third beam 112c, and a fourth beam 112d. In the embodiment, each of the light emitting devices 110 includes at least one non-visible light emitting diode (LED) capable of emitting a non-visible beam. For example, each of the light emitting devices 110 is an infrared light emitting diode (IR-LED), and each of the first beam 112a, the second beam 112b, the third beam 112c, and the fourth beam 112d is an infrared beam. Furthermore, the display area 52, for example, is the display area of a display 50 or the display area of a projection screen. The display 50 includes a frame 54 surrounding the display area 52. In the embodiment, the optical touch apparatus 100 may be disposed on the frame 54, or be combined with the frame 54 and thereby become a part of the frame 54.

The first image detector 120a is disposed beside the display area 52, and the second image detector 120b is disposed beside the display area 52. Each of the first image detector 120a and the second image detector 120b, for example, is a complementary metal-oxide-semiconductor sensor (CMOS sensor), a charge coupled device sensor (CCD sensor), a photomultiplier (PMT), or other suitable image sensors.

The first light guiding unit 130a is disposed beside the display area 52, located within a detecting range of the second image detector 120b, and located in a transmission path of the first beam 112a. The second light guiding unit 130b is disposed beside the display area 52, located within a detecting range of the first image detector 120a and the detecting range of the second image detector 120b, and located in transmission paths of the second beam 112b and the third beam 112c. The second light emitting device 110b and the third light emitting device 110c are respectively located at two opposite sides of the second light guiding unit 130b. The second light emitting device 110b is nearer to the first light guiding unit 130a than the third light emitting device 110c is, and the third light emitting device 110c is nearer to the third light guiding unit 130c than the second light emitting device 110b is. The third light guiding unit 130c is disposed beside the display area 52, located within the detecting range of the first image detector 120a, and located in a transmission path of the fourth beam 112d.

In the embodiment, the first light guiding unit 130a has a light incident surface 132a and a light emitting surface 134a. The first beam 112a emitted by the first light emitting device 110a is capable of entering the first light guiding unit 130a through the light incident surface 132a. After being guided by the first light guiding unit 130a, the first beam 112a leaves the first light guiding unit 130a through the light emitting surface 134a to form a linear light source. Specifically, in the embodiment, the first light guiding unit 130a includes a light guiding bar 131 and a reflecting unit 133. The light guiding bar 131 has the light incident surface 132a, the light emitting surface 134a, a first surface P1, a second surface P2, a third surface P3, and a fourth surface P4. Herein, the light emitting surface 134a is adjacent to the light incident surface 132a, and the first surface P1 is opposite to the light incident surface 132a. The second surface P2, the third surface P3, and the fourth surface P4 connect the light incident surface 132a and the first surface P1. The reflecting unit 133 may be disposed on at least one of the first surface P1 through the fourth surface P4. The reflecting unit 133, for example, is a reflector or a reflective coating.

The second light guiding unit 130b is similar to the first light guiding unit 130a, and the difference therebetween lies in that the second light guiding unit 130b has two opposite light incident surfaces 132b and 134b. The second beam 112b emitted by the second light emitting device 110b and the third beam 112c emitted by the third light emitting device 110c enter the second light guiding unit 130b respectively through the light incident surfaces 132a and 134b, and leave the second light guiding unit 130b through the light emitting surface 136b to form a linear light source. Furthermore, the fourth beam 112d emitted by the fourth light emitting device 110d enters the third light guiding unit 130c through the light incident surfaces 132c thereof, and leaves the third light guiding unit 130c through the light emitting surface 134c. Herein, the third light guiding unit 130c is similar to the second light guiding unit 130b, and the difference therebetween lies in that the positions of the light emitting surfaces are different.

In the embodiment, the first image detector 120a and the second image detector 120b are respectively disposed at two neighboring corners of the display area 52. The first light guiding unit 130a and the third light guiding unit 130c are respectively disposed at two opposite sides of the display area 52. The first light guiding unit 130a and the second light guiding unit 130b are respectively disposed at two neighboring sides of the display area 52. The second light guiding unit 130b and the third light guiding unit 130c are respectively disposed at two neighboring sides of the display area 52. Furthermore, the second light guiding unit 130b is opposite to the first image detector 120a and the second image detector 120b. Moreover, in the embodiment, the first light guiding unit 130a is located between the first light emitting device 110a and the first image detector 120a, and the third light guiding unit 130c is located between the fourth light emitting device 110d and the second image detector 120b.

Besides, in the embodiment, the second light emitting device 110b is nearer to the first light guiding unit 120a than the third light emitting device 110c is, and the third light emitting device 110c is nearer to the second image detector 120b than the second light emitting device 110b is.

The control unit 140 is electrically connected to the first light emitting device 110a, the second light emitting device 110b, the third light emitting device 110c, the fourth light emitting device 110d, the first image detector 120a, and the second image detector 120b. When a touch object 60 approaches to or touches the display area 52, the touch boject 60 shields the light emitted from the light emitting surfaces 134a, 134c, and 136b of the light guiding units 130a, 130b, and 130c and entering the first image detector 120a and the second image detector 120b, so that dark spots appear in the images detected by the first image detector 120a and the second image detector 120b. By analyzing the positions of the dark spots, the control unit 140 may calculate the position of the touch object 60 relative to the display area 52 to achieve the effect of touch control. The touch object 60, for example, is a user's finger, a tip of a touch pen, or other suitable objects. Furthermore, the control unit 140, for example, is a digital signal processor (DSP) or other suitable control circuits. The control unit 140 may be electrically connected to a processor of an operating platform, such as a computer, a mobile phone, a personal digital assistant (PDA), a digital camera, or suitable processors of other electronic devices, and the processor of the operating platform may convert the signal of the position of the touch object 60 relative to the display area 52 to various kinds of different control functions. In other embodiments, the processor of the operating platform may calculate the position of the touch object 60 relative to the display area 52 instead of the control unit 140.

Figure 3B:
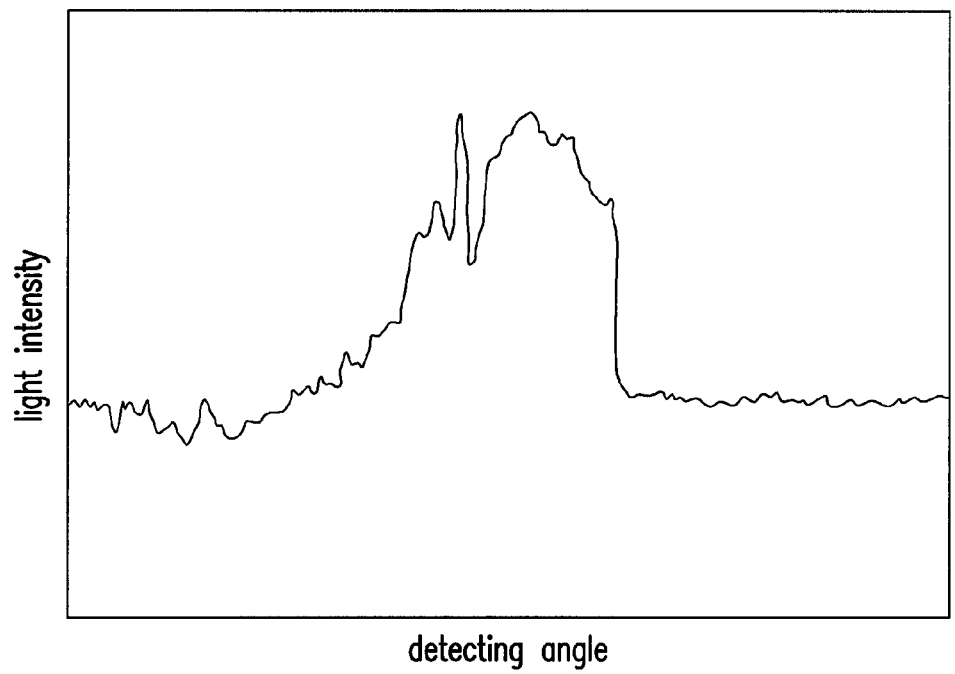
FIG. 3B is a distribution of the light intensity detected by the first image detector when the average brightness of the second light emitting device, the average brightness of the third light emitting device, and the average brightness of the fourth light emitting device are equal.

The characteristics of light guiding units 130a, 130b, and 130c make the emitting light tilt an angle relative to the light emitting surfaces 134a, 136b, and 134c of the light guiding units 130a, 130b, and 130c. As a result, for the second image detector 120b, supposing the average brightness of each of the first light emitting device 110a, the second light emitting device 110b, and the third light emitting device 110c is equal, the second image detector 120b detects higher light intensity in the left half portion of the second light guiding unit 130b and detects lower light intensity in the first light guiding unit 130a and the right half portion of the second light guiding unit 130b. This is because the second beam 112b leaving the left half portion of the second light guiding unit 130b tilts an angle relative to the light emitting surface 136b and is directly toward the second image detector 120b. The light intensity detected by the second image detector 120b may refer to FIG. 3A. As known from FIG. 3A, the light intensity detected by the second image detector 120b in the center position (corresponding to the left half portion of the second light guiding unit 130b) of detecting angle range is higher. Similarly, supposing the average brightness of each of the second light emitting device 110b, the third light emitting device 110c, and the fourth light emitting device 110d is equal, the light intensity detected by the first image detector 120a may refer to FIG. 3B. As known from FIG. 3B, the light intensity detected by the first image detector 120a in the center position (corresponding to the right half portion of the second light guiding unit 130b) of detecting angle range is higher. Under this condition, the light intensity is non-uniform, and the control unit may easily misjudge the position of the touch object 60. Accordingly, the control unit 140 of the embodiment proceeds with the following operation to improve the issue.

Figure 4A:
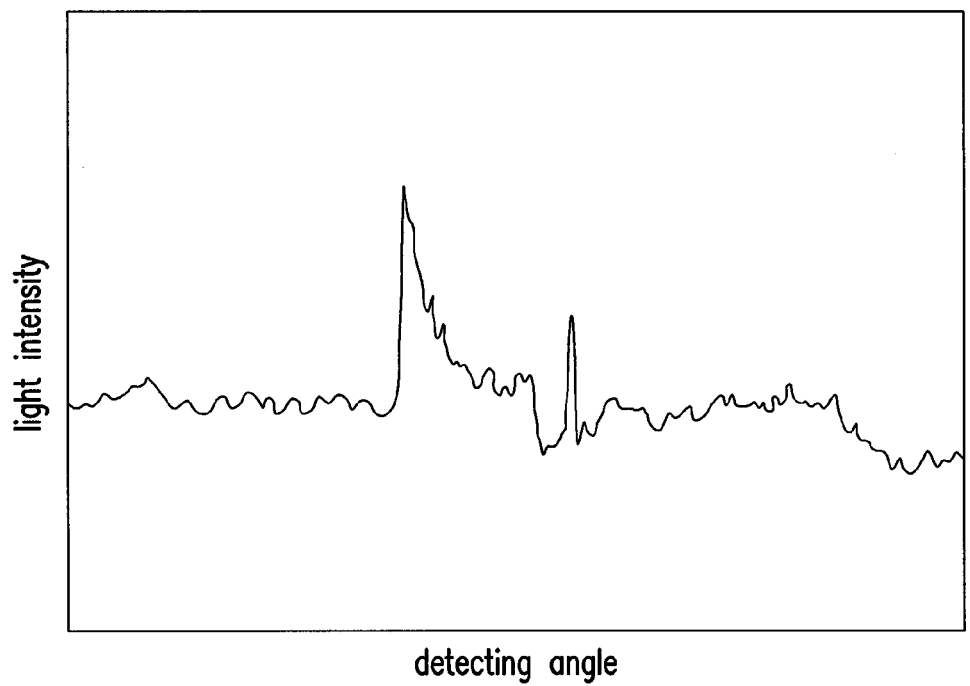
FIG. 4A and FIG. 4B are respectively distributions of the light intensity detected by the first image detector and the second image detector of the optical touch apparatus in FIG. 1.
Figure 4B:
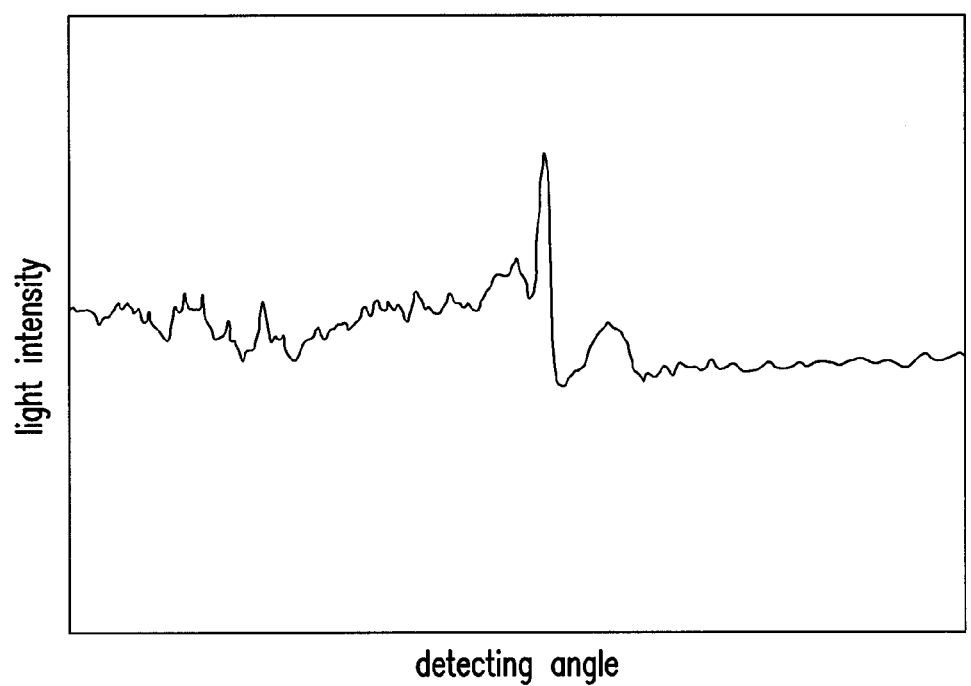

The control unit 140 controls the average brightness of the third light emitting device 110c less than the average brightness of the second light emitting device 110b and less than the average brightness of the fourth light emitting device 110d when the control unit 140 controls the first image detector 120a to detect the image (e.g. in a first unit time). Herein, the average brightness is defined as the average brightness in the first unit time, that is, the summation of the brightness at all time points in a unit time (the first unit time) divided by the length of the unit time. As a result, the first image detector 120a may detect a light intensity distribution as shown in FIG. 4B, and the light intensity distribution of FIG. 4B is more uniform than the light intensity distribution of FIG. 3B. Accordingly, the probability of misjudging the position of the touch object 60 by the control unit 140 may be effectively reduced, thereby effectively enhancing the accuracy of optical touch apparatus 100.

In another embodiment, the control unit 140 proceeds with the following operation to improve the above issue. The control unit 140 controls the average brightness of the second light emitting device 110b less than the average brightness of the first light emitting device 110a and less than the average brightness of the third light emitting device 110c when the control unit 140 controls the second image detector 120b to detect the image (e.g. in a second unit time). Herein, the average brightness is defined as the average brightness in the second unit time, that is, the summation of the brightness at all time points in a unit time (the second unit time) divided by the length of the unit time. As a result, the second image detector 120b may detect a light intensity distribution as shown in FIG. 4A, and the light intensity distribution of FIG. 4A is more uniform than the light intensity distribution of FIG. 3A. Accordingly, the probability of misjudging the position of the touch object 60 by the control unit 140 may be effectively reduced, thereby effectively enhancing the accuracy of optical touch apparatus 100.

Specifically, the control unit 140 controls the average brightness of the second light emitting device 110b, the average brightness of the third light emitting device 110c, and the average brightness of the fourth light emitting device 110d respectively to be a first average brightness, a second average brightness, and a third average brightness when the control unit 140 controls the first image detector 120a to detect the image (e.g. in the first unit time). Herein, the second average brightness is less than the first average brightness, and the second average brightness is less than the third average brightness.

Specifically, in another embodiment, the control unit 140 controls the average brightness of the first light emitting device 110a, the average brightness of the second light emitting device 110b, and the average brightness of the third light emitting device 110c respectively to be a fourth average brightness, a fifth average brightness, and a sixth average brightness when the control unit 140 controls the second image detector 120b to detect the image (e.g. in the second unit time). Herein, the fifth average brightness is less than the fourth average brightness, and the fifth average brightness is less than the sixth average brightness.

Furthermore, in an embodiment, the second average brightness is less than the sixth average brightness, and the fifth average brightness is less than the first average brightness. Moreover, in order to make the light intensity detected by the first image detector 120a and the second image detector 120b more identical, in an embodiment, the third average brightness may be controlled to be substantially equal to the fourth average brightness.

In the embodiment, the control unit 140 controls the first light emitting device 110a not to emit the first beam 112a when the control unit 140 controls the first image detector 120a to detect the image (e.g. in the first unit time). In the first unit time, because the first image detector 120a detects the second light guiding unit 130b and the third light guiding unit 130c but not detects the first light guiding unit 130a, for the first image detector 120a, the first beam 112a may easily generate the stray light. Accordingly, at this time, the first light emitting device 110a is controlled not to emit the first beam 112a, so as to enhance the uniformity of the light detected by the first image detector 120a. Similarly, in another embodiment, the control unit 140 controls the fourth light emitting device 110d not to emit the fourth beam 112d to enhance the uniformity of the light detected by the second image detector 120b when the control unit 140 controls the second image detector 120b to detect the image.

Furthermore, in an embodiment, the control unit 140 is adapted to alternately control the first image detector 120a and the second image detector 120b to detect the image. That is, the first unit time and the second unit time alternately proceed. In this manner, the optical touch apparatus 100 may continuously detect the position change of the touch object 60.

Figure 5:
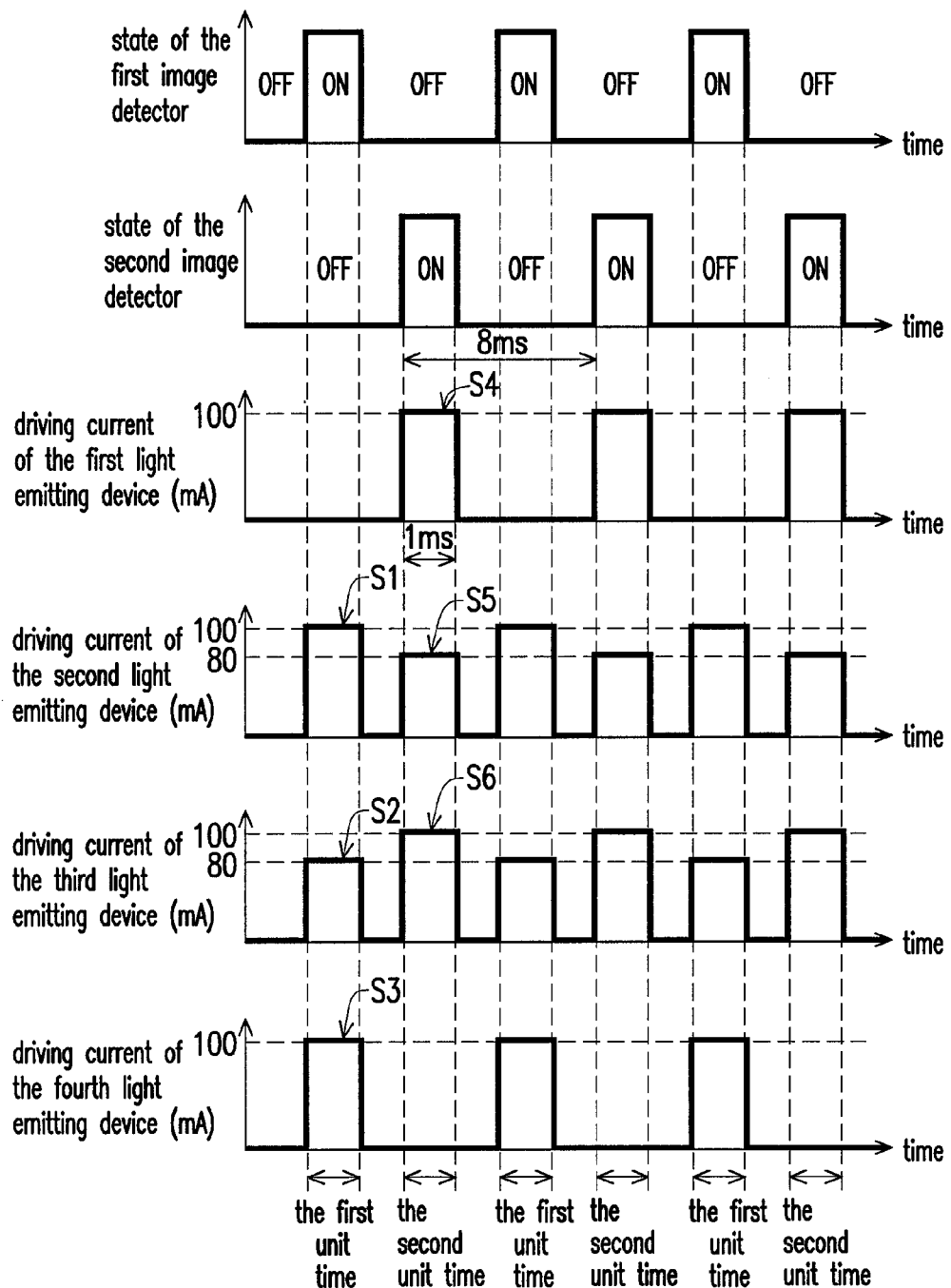
FIG. 5 is a timing diagram of the optical touch apparatus shown in FIG. 1.

Referring FIG. 1 and FIG. 5, in the embodiment, the control unit 140 respectively provides a first pulse driving signal S1, a second pulse driving signal S2, and a third pulse driving signal S3 to the second light emitting device 110b, the third light emitting device 110c, and the fourth light emitting device 110d when the control unit 140 controls the first image detector 120a to detect the image (e.g. in the first unit time). Furthermore, in another embodiment, the control unit 140 respectively provides a fourth pulse driving signal S4, a fifth pulse driving signal S5, and a sixth pulse driving signal S6 to the first light emitting device 110a, the second light emitting device 110b, and the third light emitting device 110c when the control unit 140 controls the second image detector 120b to detect the image (e.g. in the second unit time). In FIG. 5, the notation "ON" represents a state that the image detector detects, and the notation "OFF" represents a state that the image detector does not detect. Besides, in the embodiment, the first to the sixth pulse driving signals S1-S6, for example, are current driving signals.

In the embodiment, the amplitude of the second pulse driving signal S2 is less than the amplitude of the first pulse driving signal S1 and less than the amplitude of the third pulse driving signal S3. As a result, the second average brightness may be less than the first average brightness and less than the third average brightness. Furthermore, the amplitude of the fifth pulse driving signal S5 is less than the amplitude of the fourth pulse driving signal S4 and less than the amplitude of the sixth pulse driving signal S6. As a result, the fifth average brightness may be less than the fourth average brightness and the sixth average brightness.

In addition, in the embodiment, the amplitude of the second pulse driving signal S2 is less than the amplitude of the sixth pulse driving signal S6, and the amplitude of the fifth pulse driving signal S5 is less than the amplitude of the first pulse driving signal S1. Moreover, in the embodiment, the amplitude of the third pulse driving signal S3 is substantially equal to the amplitude of the fourth pulse driving signal S4. For example, each of the length of the first unit time and the length of the second unit time is 1 millisecond, each of the switch periods of the first image detector 120a and the second image detector 120b is 8 milliseconds, each of the amplitudes of the first, the third, the fourth, and the sixth pulse driving signals S1, S3, S4, and S6 is 100 milliamperes, and each of the amplitudes of the second and the fifth pulse driving signals S2 and S5 is 80 milliamperes, but the invention is not limited thereto.

Figure 6:
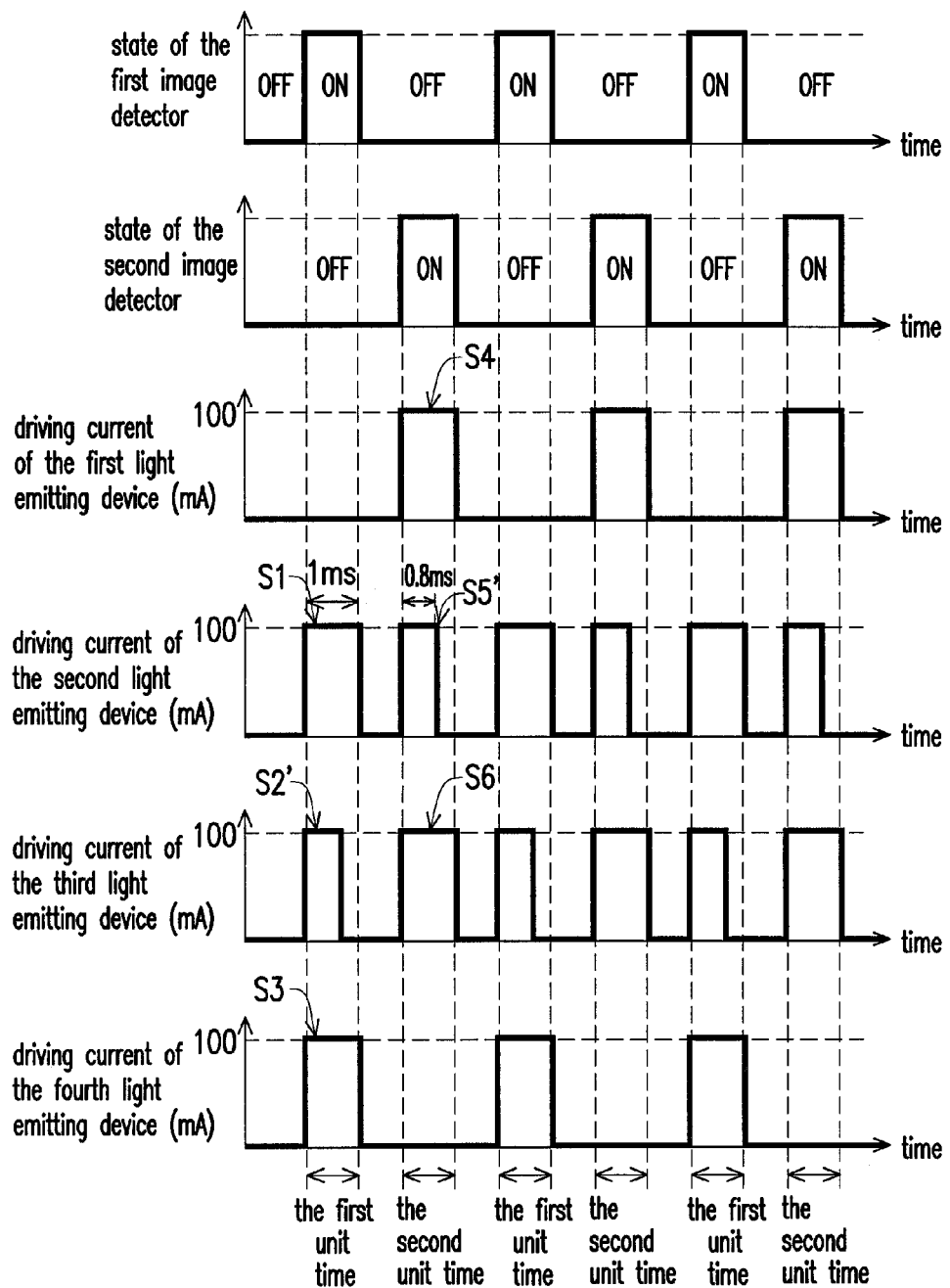
FIG. 6 is a timing diagram of an optical touch apparatus according to another embodiment of the invention.

The above method to adjust the average brightness is achieved by adjusting the amplitude of the pulse driving signal, but in another embodiment, the method to adjust the average brightness may be achieved by adjusting the pulse width of the pulse driving signal. Referring to FIG. 6, the timing diagram of the embodiment is similar to the timing diagram in FIG. 5, and the difference therebetween is described as below. In the embodiment, the pulse width of the second pulse driving signal S2' is less than the pulse width of the first pulse driving signal 51 and less than the pulse width of the third pulse driving signal S3. As a result, the second average brightness may be less than the first average brightness and less than the third average brightness. Furthermore, the pulse width of the fifth pulse driving signal S5' is less than the pulse width of the fourth pulse driving signal S4 and less than the pulse width of the sixth pulse driving signal S6. As a result, the fifth average brightness may be less than the fourth average brightness and less than the sixth average brightness. In addition, in the embodiment, the pulse width of the second pulse driving signal S2' is less than the pulse width of the sixth pulse driving signal S6, and the pulse width of the fifth pulse driving signal S5' is less than the pulse width of the first pulse driving signal S1. Moreover, in the embodiment, the pulse width of the third pulse driving signal S3 is substantially equal to the pulse width of the fourth pulse driving signal S4. For example, each of the amplitudes of the first, the second, the third, the fourth, the fifth, and the sixth pulse driving signals S1, S2', S3, S4, S5', and S6 is 100 milliamperes, each of the pulse widths of the second and the fifth pulse driving signals S2' and S5' is 0.8 millisecond, and each of the pulse widths of the first, the third, the fourth, and the sixth pulse driving signals S1, S3, S4, and S6 is 1 millisecond, but the invention is not limited thereto.

In other embodiments, it can be achieved to adjust the average brightness by simultaneously adjusting the amplitude and the pulse width of the pulse driving signal. Furthermore, the pulse driving signal with lower frequency but larger amplitude may be replaced by the pulse driving signal with higher frequency but smaller amplitude when the power of the adopted light emitting device is lower. Moreover, the adjustment degree for each of the average brightness of the pulse driving signals is not limited to be fixed. In other embodiments, by electrically connecting an operation interface with the control unit 140, the manufacturer or the user may select a suitable adjustment degree for the average brightness according to the requirement of the uniformity of the detecting light. For example, in FIG. 5, the amplitude of the pulse driving signal is adjusted from 100 milliamperes to 80 milliamperes, but after being adjusted by the operation interface, the amplitude of the pulse driving signal may be adjusted from 100 milliamperes to 50 milliamperes. Alternatively, when the devices in the optical touch apparatus 100 are replaced with the devices with different specifications, by adjusting the adjustment degree of the average brightness through the operation interface, the image detectors may be maintained to detect uniform light distributions.

Referring to FIG. 1, FIG. 7A, FIG. 7B, and FIG. 8, in the embodiment, the control unit 140 includes a main control circuit 142, a first current control circuit 144a, a second current control circuit 144b, a first current driving circuit 146a, a second current driving circuit 146b, a third current driving circuit 146c, and a fourth current driving circuit 146d. The main control circuit 142 is electrically connected to the first image detector 120a and the second image detector 120b. The first current control circuit 144a is electrically connected to the main control circuit 142, and the second current control circuit 144b is electrically connected to the main control circuit 142. The first current driving circuit 146a is electrically connected to the main control circuit 142 and the first light emitting device 110a, and the second current driving circuit 146b is electrically connected to the main control circuit 142 and the second light emitting device 110b. Furthermore, the third current driving circuit 146c is electrically connected to the main control circuit 142 and the third light emitting device 110c, and the fourth current driving circuit 146d is electrically connected to the main control circuit 142 and the fourth light emitting device 110d.

The main control circuit 142 is capable of generating a first clock signal to the first current driving circuit 146a, the first current control circuit 144a, and the second current control circuit 144b, and the main control circuit 142 is capable of generating a second clock signal to the first current control circuit 144a, the second current control circuit 144b, and the fourth current driving circuit 146d. The first current driving circuit 146a and the fourth current driving circuit 146d are capable of respectively outputting driving currents to the first light emitting device 110a and the fourth light emitting device 110d according to the first clock signal and the second clock signal, and the first current control circuit 144a and the second current control circuit 144b are capable of respectively modulating driving currents outputted to the second light emitting device 110b and the third light emitting device 110c by the second current driving circuit 146b and the third current driving circuit 146c simultaneously according to the first clock signal and the second clock signal.

Specifically, the first current driving circuit 146a controls the average brightness of the first light emitting device 110a to be a high average brightness when the first clock signal received by the first current driving circuit 146a stays at a first voltage level (a high voltage level in the embodiment, i.e. the logic 1). In the embodiment, the first light emitting device 110a is driven by the fourth pulse driving signal S4 with 100 milliamperes. The second current driving circuit 146b controls the average brightness of the second light emitting device 110b to be a low average brightness when the first clock signal received by the first current control unit 144a stays at the first voltage level (i.e. the high voltage level or the logic 1), and the second clock signal received by the first current control unit 144a stays at a third voltage level (a low voltage level in the embodiment, i.e. the logic 0). In the embodiment, the second light emitting device 110b is driven by the fifth pulse driving signal S5 with 80 milliamperes. Herein, the low average brightness is less than the high average brightness. The second current driving circuit 146b controls the average brightness of the second light emitting device 110b to be the high average brightness when the first clock signal received by the first current control unit 144a stays at the second voltage level (the low voltage level in the embodiment, i.e. the logic 0), and the second clock signal received by the first current control unit 144a stays at a fourth voltage level (the high voltage level in the embodiment, i.e. the logic 1). That is, the second light emitting device 110b is driven by the first pulse driving signal S1 with 100 milliamperes. The third current driving circuit 146c controls the average brightness of the third light emitting device 110c to be the high average brightness when the first clock signal received by the second current control unit 144b stays at the first voltage level (i.e. the high voltage level or the logic 1), and the second clock signal received by the second current control unit 144b stays at the third voltage level (i.e. the low voltage level or the logic 0). That is, the third light emitting device 110c is driven by the sixth pulse driving signal S6 with 100 milliamperes. The third current driving circuit 146c controls the average brightness of the third light emitting device 110c to be the low average brightness when the first clock signal received by the second current control unit 144b stays at the second voltage level (i.e. the low voltage level or the logic 0), and the second clock signal received by the second current control unit 144b stays at the fourth voltage level (i.e. the high voltage level or the logic 1). That is, the third light emitting device 110c is driven by the second pulse driving signal S2 with 80 milliamperes. The fourth current driving circuit 146d controls the average brightness of the fourth light emitting device 110d to be the high average brightness when the second clock signal received by the fourth current driving circuit 146d stays at the fourth voltage level (i.e. the high voltage level or the logic 1). That is, the fourth light emitting device 110d is driven by the third pulse driving signal S3 with 100 milliamperes.

Besides, in the embodiment, the first current driving circuit 146a controls the first light emitting device 110a not to emit the first beam 112a, e.g. the driving current is 0, when the first clock signal received by the first current driving circuit 146a stays at the second voltage level (the low voltage level or the logic 0). The fourth current driving circuit 146d controls the fourth light emitting device 110d not to emit the fourth beam 112d, e.g. the driving current is 0, when the second clock signal received by the fourth current driving circuit 146d stays at the third voltage level (the low voltage level or the logic 0). The above embodiment is exemplary, and the invention is not limited thereto.

Figure 7A:
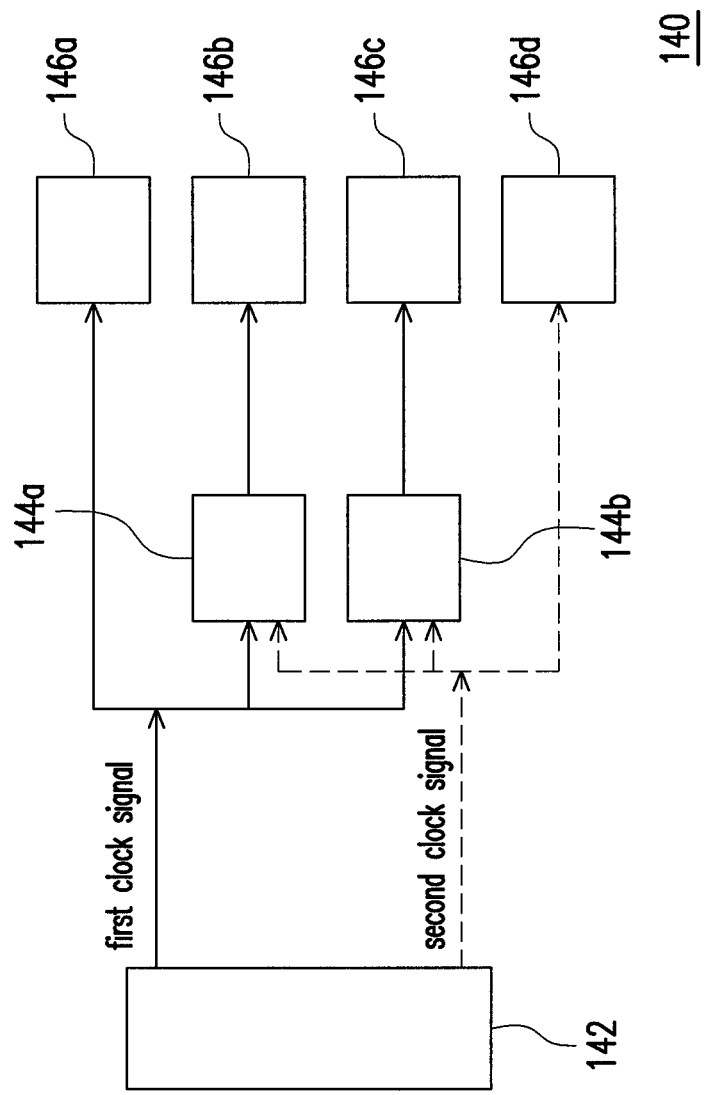
FIG. 7A is a schematic block diagram of the control unit of FIG. 1.
Figure 7B:
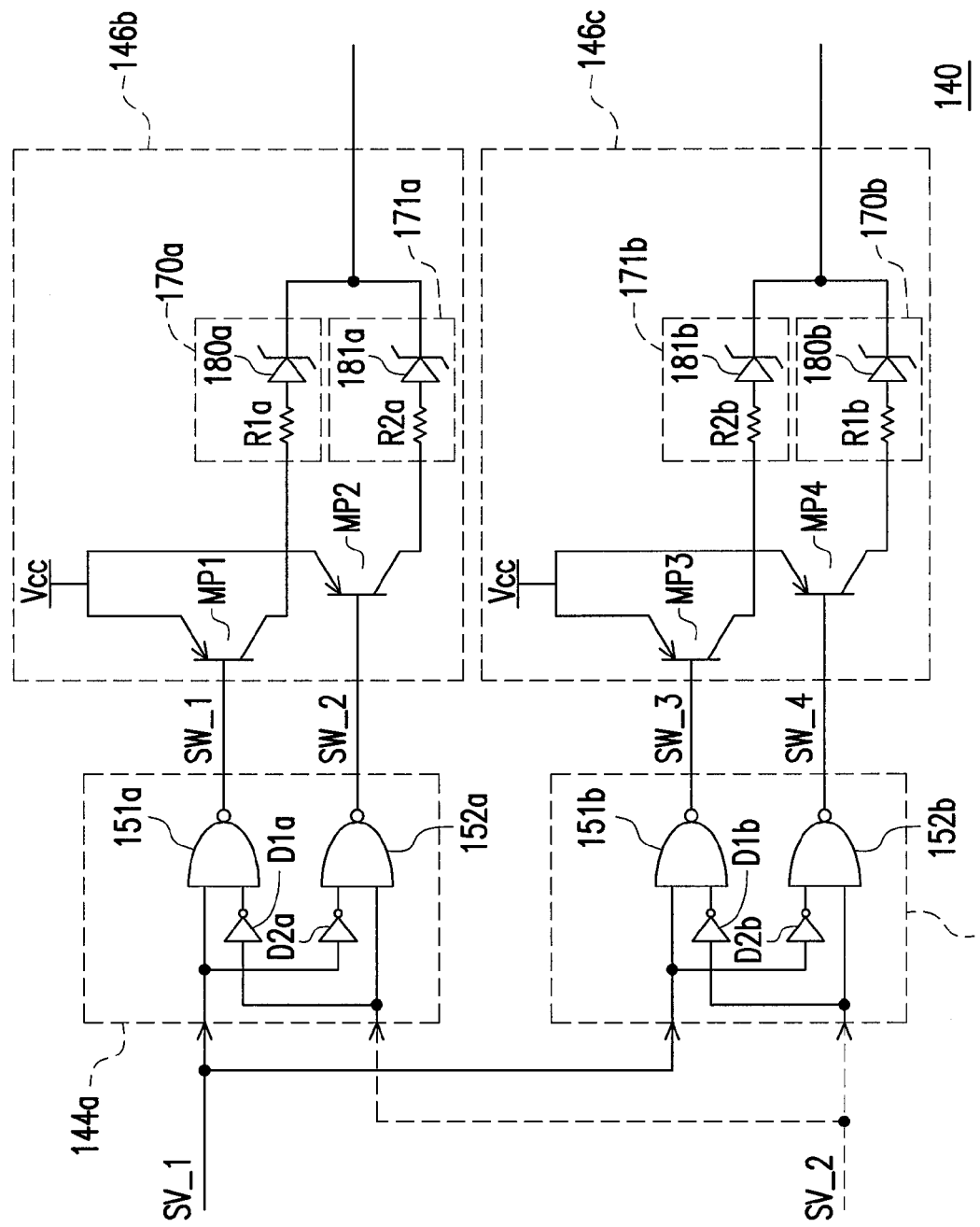
FIG. 7B is a circuit diagram including a first current control circuit, a second current control circuit, a second current driving circuit, and a third current driving circuit in FIG. 7A.
Figure 8:
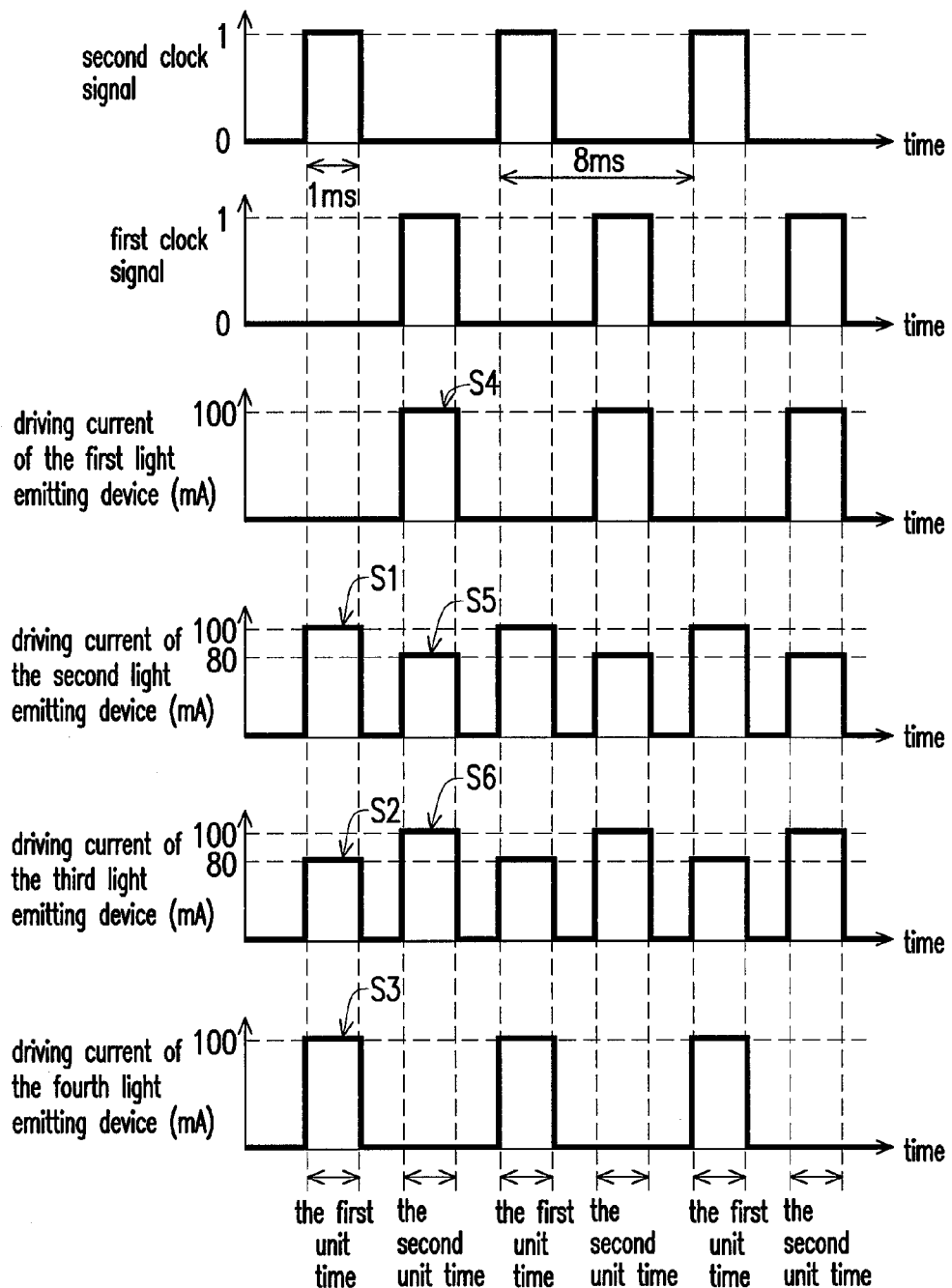
FIG. 8 is a timing diagram of the control unit of FIG. 7A.

In following, by FIG. 7B, the circuit configuration of the first current control circuit 144a, the second current control circuit 144b, the third current driving circuit 146c, and the fourth current driving circuit 146d is illustrated, but the circuit configuration shown in FIG. 7B is simply exemplary. Accordingly, the invention is not limited thereto, and any circuit configuration achieving the same effect should be included within the scope of the invention. Referring to FIG. 7B, in the embodiment, the first current control circuit 144a includes NAND gates 151a and 151b and inverting gates D1a and D2a. Herein, the first input end of the NAND gate 151a receives the first clock signal SV_1, the second input end of the NAND gate 151a is coupled to the negative pole of the inverting gate D1a, and the output end of the NAND gate 151a generates the first control signal SW_1. Furthermore, the positive pole of the inverting gate D1a receives the second clock signal SV_2. The first input end of the NAND gate 152a is coupled to the negative pole of the inverting gate D2a, the second input end of the NAND gate 152a receives the second clock signal SV_2, and the output end of the NAND gate 152a generates the second control signal SW_2. Furthermore, the positive pole of the inverting gate D2a receives the first clock signal SV_1. The second current control circuit 144b is similar to the first current control circuit 144a. The second current control circuit 144b includes NAND gates 151b and 152b and inverting gates D1b and D2b, and the connection of the second current control circuit 144b is the same as the connection of the first current control circuit 144a. Herein, the output end of the NAND gate 151b generates the third control signal SW_3, and the output end of the NAND gate 152b generates the fourth control signal SW_4.

The second current driving circuit 146b includes transistors MP1 and MP2 and current limiting circuits 170a and 171a. The first ends of the transistors MP1 and MP2 are both coupled to the system voltage Vcc. The control ends of the transistors MP1 and MP2 are respectively electrically connected to the output ends of the NAND gates 151a and 152a, and thereby respectively receive the first control signal SW_1 and the second control signal SW_2. The second end of the transistor MP1 is coupled to the input end of the current limiting circuit 170a, and the second end of the transistor MP2 is coupled to the input end of the current limiting circuit 171a. The output ends of the current limiting circuits 170a and 171a are coupled to each other to form the output end of the second current driving circuit 146b.

The third current driving circuit 146c includes transistors MP3 and MP4 and current limiting circuits 170b and 171b. The first ends of the transistors MP3 and MP4 are both coupled to the system voltage Vcc. The control ends of the transistors MP1 and MP2 are respectively electrically connected to the output ends of the NAND gates 151b and 152b, and thereby respectively receive the third control signal SW_3 and the fourth control signal SW_4. The second end of the transistor MP3 is coupled to the input end of the current limiting circuit 171b, and the second end of the transistor MP4 is coupled to the input end of the current limiting circuit 170b. The output ends of the current limiting circuits 170b and 171b are coupled to each other to form the output end of the second current driving circuit 146b.

Herein, the output ends of the current limiting circuits 170a and 170b accordingly generate a current with 80 milliamperes (mA) when the input ends of the current limiting circuits 170a and 170b receive the system voltage Vcc. Herein, the output ends of the current limiting circuits 171a and 171b accordingly generate a current with 100 milliamperes (mA) when the input ends of the current limiting circuits 171a and 171b receive the system voltage Vcc. People using the embodiment may freely achieve the objective of the current limiting circuits 170a, 170b, 171a, and 171b as required. In the embodiment, the current limiting circuits 170a and 170b are respectively formed by resistors R1a and R1b and Zener diodes 180a and 180b. The current limiting circuits 171a and 171b are respectively formed by resistors R2a and R2b and Zener diodes 181a and 181b. In other embodiments, current mirrors may be used to implement the current limiting circuits 170a, 170b, 171a, and 171b.

In order to make the invention more comprehensible for those skilled in the art, the first current control circuit 144a and the second current driving circuit 146b may be further illustrated in detail as follows. The first input end of the NAND gate 151a receives a signal with the high voltage level when the first clock signal SV_1 received by the first current control circuit 144a stays at the high voltage level (i.e. the first voltage level), and the second clock signal SV_2 received thereby stays at the low voltage level (i.e. the third voltage level). The second clock signal SV_2 is inverted from the low voltage level to the high voltage level by the inverting gate D1a and is inputted to the second input end of the NAND gate 151a. Accordingly, the first control signal SW_1 generated by the output end of the NAND gate 151a is a signal with the low voltage level. In the meanwhile, the first and the second input ends of the NAND gate 152a both receives signals with the low voltage level, and the second control signal SW_2 generated by the output end thereof is a signal with the high voltage level.

Next, in the second current driving circuit 146b, the control ends of the transistors MP1 and MP2 respectively receives the first control signal SW_1 with the high voltage level and the second control signal SW_2 with the low voltage level. Herein, because the control end of the transistor MP1 receives the first control signal SW_1 with the low voltage level, the first and the second ends of the transistor MP1 are conducted. Accordingly, the input end of the current limiting circuits 170a receives the system voltage Vcc, and thereby, the output end of the current limiting circuits 170a generates a current with 80 mA to serve as the fifth pulse driving signal S5. The control end of the transistor MP2 receives the second control signal SW_2 with the high voltage level, and the first and the second ends of the transistor MP2 are not conducted. Accordingly, the current limiting circuits 171a may not be activated.

If the first clock signal SV_1 received by the first control circuit 144a stays at the low voltage level (i.e. the second voltage level) and the second clock signal SV_2 received thereby stays at the high voltage level (i.e. the fourth voltage level), the first input end of the NAND gate 151a receives a signal with the low voltage level. The second clock signal SV_2 is inverted from the high voltage level to the low voltage level by the inverting gate D1a and is inputted to the second input end of the NAND gate 151a. Accordingly, the first control signal SW_1 generated by the output end of the NAND gate 151a is a signal with the high voltage level. In the meanwhile, the first and the second input ends of the NAND gate 152a both receives signals with the high voltage level, and the second control signal SW_2 generated by the output end of the NAND gate 152a is a signal with the low voltage level.

In the second current driving circuit 146b, the control ends of the transistors MP1 and MP2 respectively receives the first control signal SW_1 with the low voltage level and the second control signal SW_2 with the high voltage level. Because the control end of the transistor MP1 receives the second control signal SW_2 with the low voltage level, the first and the second ends of the transistor MP1 are not conducted. Accordingly, the current limiting circuits 170a may not be activated.

On the contrary, because the control end of the transistor MP2 receives the first control signal SW_1 with the low voltage level, the first and the second ends of the transistor MP2 are conducted. Accordingly, the input end of the current limiting circuits 171a receives the system voltage Vcc, and thereby, the output end of the current limiting circuits 171a generates a current with 100 mA to serve as the first pulse driving signal S1.

The operation of the second current control circuit 144b and the third current driving circuit 146c is similar to the operation of the first current control circuit 144a and the second current driving circuit 146b. Hence, the same descriptions thereof are omitted hereafter. Herein, the current limiting circuits 171b in the second current driving circuit 146b generates a current with 100 mA to serve as the sixth pulse driving signal S6 when the first clock signal SV_1 received by the first current control circuit 144b stays at the high voltage level (i.e. the first voltage level) and the second clock signal SV_2 received by the second current control circuit 144b stays at the low voltage level (i.e. the third voltage level). Otherwise, the current limiting circuits 170b in the second current driving circuit 146b generates a current with 80 mA to serve as the second pulse driving signal S2 when the first clock signal SV_1 received by the first current control circuit 144b stays at the low voltage level (i.e. the second voltage level), and the second clock signal SV_2 received by the first current control circuit 144b stays at the high voltage level (i.e. the fourth voltage level).

Figure 9:
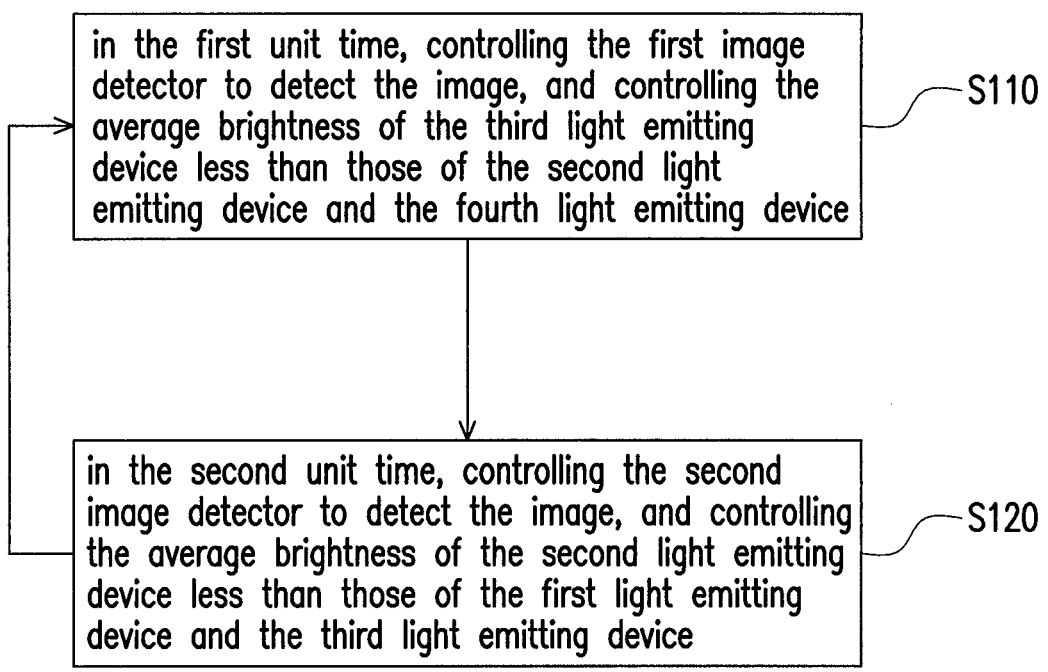
FIG. 9 is a flow chart of a driving method according to an embodiment of the invention.

Referring to FIG. 1 and FIG. 9, the driving method is adapted to drive the optical touch apparatus 100 in FIG. 1. The driving method includes following steps. First, in step S110, the first image detector 120a is controlled to detect the image in the first unit time, and the average brightness of the third light emitting device 110c is controlled to be less than the average brightness of the second light emitting device 110b and less than the average brightness of the fourth light emitting device 110d. Next, in step S120, the second image detector 120b is controlled to detect the image in the second unit time, and the average brightness of the second light emitting device 110b is controlled to be less than the average brightness of the first light emitting device 110a and less than the average brightness of the third light emitting device 110c. Herein, the first image detector 120a is capable of detecting the light emitted by the second light emitting device 110b, the third light emitting device 110c, and the fourth light emitting device 110d, and the second image detector 120b is capable of detecting the light emitted by the first light emitting device 110a, the second light emitting device 110b, and the third light emitting device 110c.

In the driving method of the embodiment, the detail operation performed in steps S110 (i.e. in the first unit time) and S120 (i.e. in the second unit time) may respectively refer to the operation of the control unit 140 performed in the first unit time and in the second unit time in the above embodiment. Hence, the descriptions thereof are omitted hereafter. Furthermore, in the driving method of the embodiment, steps S110 and S120 may be alternately repeated, so that the optical touch apparatus 100 may continuously detect the position change of the touch object 60.

In summary, the embodiment or the embodiments of the invention may have at least one of the following advantages:

In the optical touch apparatus and the driving method of the embodiment of the invention, when the different image detectors detect images, by modulating the brightness of these light emitting devices, the image detectors may detect more uniform light distribution, thereby enhancing the accuracy, the uniformity, and the planarity of the optical touch apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical touch apparatus, comprising:
  a plurality of light emitting devices comprising a first light emitting device, a second light emitting device, a third light emitting device, and a fourth light emitting device respectively disposed beside a display area and capable of respectively emitting a first beam, a second beam, a third beam, and a fourth beam;
  a first image detector disposed beside the display area;
  a second image detector disposed beside the display area;
  a first light guiding unit disposed beside the display area, located within a detecting range of the second image detector, and located in a transmission path of the first beam;
  a second light guiding unit disposed beside the display area, located within a detecting range of the first image detector and a detecting range of the second image detector, and located in transmission paths of the second beam and the third beam, wherein the second light emitting device and the third light emitting device are respectively located at two opposite sides of the second light guiding unit;
  a third light guiding unit disposed beside the display area, located within the detecting range of the first image detector, and located in a transmission path of the fourth beam, wherein the second light emitting device is nearer to the first light guiding unit than the third light emitting device is, and the third light emitting device is nearer to the third light guiding unit than the second light emitting device is; and a control unit electrically connected to the first light emitting device, the second light emitting device, the third light emitting device, the fourth light emitting device, the first image detector, and the second image detector, wherein the control unit controls an average brightness of the second light emitting device, an average brightness of the third light emitting device, and an average brightness of the fourth light emitting device respectively to be a first average brightness, a second average brightness, and a third average brightness when the control unit controls the first image detector to detect a first image, the second average brightness of the third light emitting device is less than the first average brightness of the second light emitting device, and the second average brightness of the third light emitting device is less than the third average brightness of the fourth light emitting device, and the control unit controls the average brightness of the first light emitting device, the average brightness of the second light emitting device, and the average brightness of the third light emitting device respectively to be a fourth average brightness, a fifth average brightness, and a sixth average brightness when the control unit controls the second image detector to detect a second image, and the fifth average brightness of the second light emitting device is less than the fourth average brightness of the first light emitting device, and the fifth average brightness of the second light emitting device is less than the sixth average brightness of the third light emitting device, wherein the second average brightness is less than the sixth average brightness, and the fifth average brightness is less than the first average brightness.

2. The optical touch apparatus as claimed in claim 1, wherein the third average brightness is substantially equal to the fourth average brightness.

3. The optical touch apparatus as claimed in claim 1, wherein the control unit controls the first light emitting device not to emit the first beam when the control unit controls the first image detector to detect the first image, and the control unit controls the fourth light emitting device not to emit the fourth beam when the control unit controls the second image detector to detect the second image.

4. The optical touch apparatus as claimed in claim 1, wherein the control unit is capable of alternately controlling the first image detector and the second image detector to detect the first image and the second image respectively.

5. The optical touch apparatus as claimed in claim 1, wherein the control unit respectively provides a first pulse driving signal, a second pulse driving signal, and a third pulse driving signal to the second light emitting device, the third light emitting device, and the fourth light emitting device when the control unit controls the first image detector to detect the first image, and the control unit respectively provides a fourth pulse driving signal, a fifth pulse driving signal, and a sixth pulse driving signal to the first light emitting device, the second light emitting device, and the third light emitting device when the control unit controls the second image detector to detect the second image, wherein an amplitude of the second pulse driving signal is less than an amplitude of the first pulse driving signal and less than an amplitude of the third pulse driving signal, and an amplitude of the fifth pulse driving signal is less than an amplitude of the fourth pulse driving signal and less than an amplitude of the sixth pulse driving signal.

6. The optical touch apparatus as claimed in claim 5, wherein the amplitude of the second pulse driving signal is less than the amplitude of the sixth pulse driving signal, and the amplitude of the fifth pulse driving signal is less than the amplitude of the first pulse driving signal.

7. The optical touch apparatus as claimed in claim 6, wherein the amplitude of the third pulse driving signal is substantially equal to the amplitude of the fourth pulse driving signal.

8. The optical touch apparatus as claimed in claim 1, wherein the control unit respectively provides a first pulse driving signal, a second pulse driving signal, and a third pulse driving signal to the second light emitting device, the third light emitting device, and the fourth light emitting device when the control unit controls the first image detector to detect the first image, and the control unit respectively provides a fourth pulse driving signal, a fifth pulse driving signal, and a sixth pulse driving signal to the first light emitting device, the second light emitting device, and the third light emitting device when the control unit controls the second image detector to detect the second image, wherein a pulse width of the second pulse driving signal is less than a pulse width of the first pulse driving signal and less than a pulse width of the third pulse driving signal, and a pulse width of the fifth pulse driving signal is less than a pulse width of the fourth pulse driving signal and less than a pulse width of the sixth pulse driving signal.

9. The optical touch apparatus as claimed in claim 8, wherein the pulse width of the second pulse driving signal is less than the pulse width of the sixth pulse driving signal, and the pulse width of the fifth pulse driving signal is less than the pulse width of the first pulse driving signal.

10. The optical touch apparatus as claimed in claim 9, wherein the pulse width of the third pulse driving signal is substantially equal to the pulse width of the fourth pulse driving signal.

11. The optical touch apparatus as claimed in claim 1, wherein the control unit comprises:
a main control circuit electrically connected to the first image detector and the second image detector;
a first current control circuit electrically connected to the main control circuit;
a second current control circuit electrically connected to the main control circuit;
a first current driving circuit electrically connected to the main control circuit and the first light emitting device;
a second current driving circuit electrically connected to the main control circuit and the second light emitting device;
a third current driving circuit electrically connected to the main control circuit and the third light emitting device; and
a fourth current driving circuit electrically connected to the main control circuit and the fourth light emitting device,
wherein the main control circuit is capable of generating a first clock signal to the first current driving circuit, the first current control circuit, and the second current control circuit, wherein the main control circuit is capable of generating a second clock signal to the first current control circuit, the second current control circuit, and the fourth current driving circuit, wherein the first current driving circuit and the fourth current driving circuit are capable of respectively outputting driving currents to the first light emitting device and the fourth light emitting device according to the first clock signal and the second clock signal, and wherein the first current control circuit and the second current control circuit are capable of respectively modulating driving currents outputted to the second light emitting device and the third light emitting device by the second current driving circuit and the third current driving circuit according to the first clock signal and the second clock signal.

12. The optical touch apparatus as claimed in claim 11, wherein the first current driving circuit controls the average brightness of the first light emitting device to be a high average brightness when the first clock signal received by the first current driving circuit stays at a first voltage level, and the second clock signal received by the first current driving circuit stays at a third voltage level when the first clock signal received by the first current driving circuit stays at the first voltage level, the second current driving circuit controls the average brightness of the second light emitting device to be a low average brightness, and the low average brightness is less than the high average brightness, the second current driving circuit controls the average brightness of the second light emitting device to be the high average brightness when the first clock signal received by the first current driving circuit stays at a second voltage level, and the second clock signal received by the first current driving circuit stays at a fourth voltage level, the third current driving circuit controls the average brightness of the third light emitting device to be the high average brightness when the first clock signal received by the second current driving circuit stays at the first voltage level, and the second clock signal received by the second current driving circuit stays at the third voltage level, the third current driving circuit controls the average brightness of the third light emitting device to be the low average brightness when the first clock signal received by the second current control circuit stays at the second voltage level, and the second clock signal received by the second current control circuit stays at the fourth voltage level, and the fourth current driving circuit controls the average brightness of the fourth light emitting device to be the high average brightness when the second clock signal received by the fourth current driving circuit stays at the fourth voltage level.

13. The optical touch apparatus as claimed in claim 12, wherein the first current driving circuit controls the first light emitting device not to emit the first beam when the first clock signal received by the first current driving circuit stays at the second voltage level, and the fourth current driving circuit controls the fourth light emitting device not to emit the fourth beam when the second clock signal received by the fourth current driving circuit stays at the third voltage level.

14. The optical touch apparatus as claimed in claim 1, wherein the first image detector and the second image detector are respectively disposed at two neighboring corners of the display area, the first light guiding unit and the third light guiding unit are respectively disposed at two opposite sides of the display area, the first light guiding unit and the second light guiding unit are respectively disposed at two neighboring sides of the display area, the second light guiding unit and the third light guiding unit are respectively disposed at two neighboring sides of the display area, and the second light guiding unit is opposite to the first image detector and the second image detector.

15. The optical touch apparatus as claimed in claim 14, wherein the first light guiding unit is located between the first light emitting device and the first image detector, and the third light guiding unit is located between the fourth light emitting device and the second image detector.

16. A driving method, adapted to drive an optical touch apparatus, the driving method comprising:
controlling a first image detector of the optical touch apparatus to detect a first image, and controlling an average brightness of the second light emitting device, an average brightness of the third light emitting device, and an average brightness of the fourth light emitting device respectively to be a first average brightness, a second average brightness, and a third average brightness in a first unit time, wherein the second average brightness of a third light emitting device of the optical touch apparatus is less than the first average brightness of a second light emitting device of the optical touch apparatus and the second average brightness of a third light emitting device of the optical touch apparatus is less than the third average brightness of a fourth light emitting device of the optical touch apparatus, wherein the first image detector is capable of detecting beams emitted by the second light emitting device, the third light emitting device, and the fourth light emitting device, and the second light emitting device is nearer to the first image detector than the third light emitting device; and
controlling a second image detector of the optical touch apparatus to detect a second image, and controlling the average brightness of the first light emitting device, the average brightness of the second light emitting device, and the average brightness of the third light emitting device respectively to be a fourth average brightness, a fifth average brightness, and a sixth average brightness in a second unit time, wherein the fifth average brightness of the second light emitting device of the optical touch apparatus is less than the fourth average brightness of the first light emitting device of the optical touch apparatus and the fifth average brightness of the second light emitting device of the optical touch apparatus is less than the sixth average brightness of the third light emitting device of the optical touch apparatus, wherein the second image detector is capable of detecting beams emitted by the first light emitting device, the second light emitting device, and the third light emitting device, and the third light emitting device is nearer to the second image detector than the second light emitting device is, wherein the second average brightness is less than the sixth average brightness, and the fifth average brightness is less than the first average brightness.

17. The driving method as claimed in claim 16, wherein in the first unit time, a first light emitting device of the optical touch apparatus is further controlled not to emit light when the first image detector of the optical touch apparatus is controlled to detect the first image.

18. The driving method as claimed in claim 16, wherein in the second unit time, the fourth light emitting device of the optical touch apparatus is further controlled not to emit light when the second image detector of the optical touch apparatus is controlled to detect the second image.

19. The driving method as claimed in claim 16, wherein the third average brightness is substantially equal to the fourth average brightness.

20. The driving method as claimed in claim 16, further comprising repeating the first unit time and the second unit time alternately.

21. The driving method as claimed in claim 16, further comprising:
respectively providing a first pulse driving signal, a second pulse driving signal, and a third pulse driving signal to the second light emitting device, the third light emitting device, and the fourth light emitting device in the first unit time; and
respectively providing a fourth pulse driving signal, a fifth pulse driving signal, and a sixth pulse driving signal to the first light emitting device, the second light emitting device, and the third light emitting device in the second unit time, wherein an amplitude of the second pulse driving signal is less than an amplitude of the first pulse driving signal and less than an amplitude of the third pulse driving signal, and an amplitude of the fifth pulse driving signal is less than an amplitude of the fourth pulse driving signal and less than an amplitude of the sixth pulse driving signal.

22. The driving method as claimed in claim 21, wherein the amplitude of the second pulse driving signal is less than the amplitude of the sixth pulse driving signal, and the amplitude of the fifth pulse driving signal is less than the amplitude of the first pulse driving signal.

23. The driving method as claimed in claim 22, wherein the amplitude of the third pulse driving signal is substantially equal to the amplitude of the fourth pulse driving signal.

24. The driving method as claimed in claim 17, further comprising:
respectively providing a first pulse driving signal, a second pulse driving signal, and a third pulse driving signal to the second light emitting device, the third light emitting device, and the fourth light emitting device in the first unit time; and
respectively providing a fourth pulse driving signal, a fifth pulse driving signal, and a sixth pulse driving signal to the first light emitting device, the second light emitting device, and the third light emitting device in the second unit time, wherein a pulse width of the second pulse driving signal is less than a pulse width of the first pulse driving signal and less than a pulse width of the third pulse driving signal, and a pulse width of the fifth pulse driving signal is less than a pulse width of the fourth pulse driving signal and less than a pulse width of the sixth pulse driving signal.

25. The driving method as claimed in claim 24, wherein the pulse width of the second pulse driving signal is less than the pulse width of the sixth pulse driving signal, and the pulse width of the fifth pulse driving signal is less than the pulse width of the first pulse driving signal.

26. The driving method as claimed in claim 25, wherein the pulse width of the third pulse driving signal is substantially equal to the pulse width of the fourth pulse driving signal.

27. The driving method as claimed in claim 16, wherein a first light guiding unit is disposed beside the first light emitting device, a second light guiding unit is disposed between the second light emitting device and the third light emitting device, a third light guiding unit is disposed beside the fourth light emitting device, the first light guiding unit and the second light guiding unit are located within a detecting range of the second image detector, and the second light guiding unit and the first light guiding unit are located within a detecting range of the first image detector.

28. The driving method as claimed in claim 27, wherein the first image detector and the second image detector are respectively disposed at two neighboring corners of the display area, the first light guiding unit and the third light guiding unit are respectively disposed at two opposite sides of the display area, the first light guiding unit and the second light guiding unit are respectively disposed at two neighboring sides of the display area, the second light guiding unit and the third light guiding unit are respectively disposed at two neighboring sides of the display area, and the second light guiding unit is opposite to the first image detector and the second image detector.

29. The driving method as claimed in claim 28, wherein the first light guiding unit is located between the first light emitting device and the first image detector, and the third light guiding unit is located between the fourth light emitting device and the second image detector.

* * * * *